United States Patent
Bansal et al.

(10) Patent No.: US 6,898,569 B1
(45) Date of Patent: May 24, 2005

(54) METHOD AND APPARATUS FOR ADVANCED SCHEDULING AND MESSAGING SYSTEM

(75) Inventors: Pradeep K. Bansal, Dayton, NJ (US); Carroll W. Creswell, Basking Ridge, NJ (US)

(73) Assignee: AT&T Corp., New York, NY (US)

(*) Notice: Subject to any disclaimer, the term of this patent is extended or adjusted under 35 U.S.C. 154(b) by 647 days.

(21) Appl. No.: 09/089,011

(22) Filed: Jun. 2, 1998

(51) Int. Cl.⁷ .............................................. G06F 15/16
(52) U.S. Cl. ................... 705/9; 705/7; 705/8; 340/994; 379/88.23; 455/456.1; 701/117
(58) Field of Search ..................... 705/7, 8, 9; 455/456, 455/459, 461; 340/994; 701/117; 379/88.23; 345/330, 329

(56) References Cited

U.S. PATENT DOCUMENTS

| | | | |
|---|---|---|---|
| 4,819,191 A | * 4/1989 | Scully et al. | 345/329 |
| 4,977,520 A | 12/1990 | McGaughey, III et al. | 345/330 |
| 5,124,912 A | * 6/1992 | Hotaling et al. | 705/9 |
| 5,400,020 A | * 3/1995 | Jones et al. | 340/994 |
| 5,434,908 A | 7/1995 | Klein | 379/88.23 |
| 5,602,739 A | 2/1997 | Haagenstad et al. | 701/117 |
| 5,790,974 A | * 8/1998 | Tognazzini | 455/456 |
| 6,101,480 A | * 8/2000 | Conmy et al. | 705/9 |
| 6,144,938 A | * 11/2000 | Surace et al. | 704/257 |

FOREIGN PATENT DOCUMENTS

EP    0 329 911 A2 * 12/1988    ........... G06F/15/21

OTHER PUBLICATIONS

Dialog reference. File 47, # 04159357, Carol Levine and Melissa Perenson, Briefs, Dec. 20, 1994, PC Magazine, v13, n22, p32(1).*

* cited by examiner

Primary Examiner—Raquel Alvarez
(74) Attorney, Agent, or Firm—Kenyon & Kenyon

(57) ABSTRACT

A method and apparatus provide an advanced scheduling and messaging system in which information about an appointment is received from a user. Information about an attendee associated with the appointment, including attendee notification information, is also received. When it is determined that the user will be late for the appointment, an attendee notification message is automatically generated using the attendee notification information. Appointment time information and appointment location information can also be received by the scheduling system along with user location information. It can then be determined if the user will be late for the appointment based on the user location information, the appointment location information, the appointment time information and a time associated with the user location information.

32 Claims, 3 Drawing Sheets

METHOD AND APPARATUS FOR ADVANCED SCHEDULING AND MESSAGING SYSTEM

FIELD OF THE INVENTION

The present invention relates to scheduling systems. More particularly, the present invention relates to a method and apparatus for an advanced scheduling and messaging system.

BACKGROUND OF THE INVENTION

A scheduling system helps a user organize appointments on his or her calendar. Such systems typically include, for example, scheduling software that runs on the user's desktop computer. The user enters the date, time and expected length of various appointments, such as business meetings, and the system determines if there are any conflicts, such as two meetings scheduled on the same date at the same time.

Because the user can enter information into the system weeks in advance, additional information, such as the place where the meeting will take place and the topics that will be discussed, can be stored about each meeting. Similarly, some scheduling systems let a user store a list of other people who will attend the meeting, or "attendees."

Another feature of known scheduling systems is an automatic reminder function that alerts the user when it is time to attend a meeting. Most scheduling systems are similar to alarm clocks—they display a message on the user's computer screen and/or sound an audible alarm based on the meeting time and the current time of day. Suppose a user enters into the scheduling system a half hour appointment for 10:00 am Monday in the manager's office. After verifying that no other meeting is scheduled from 10:00 am to 10:30 am, the system stores the appointment information. At exactly 10:00 am on Monday, the system reminds the user about the meeting. Some scheduling systems are able to remind the user a fixed period of time, such as 10 minutes, before the start of an appointment.

Although known scheduling systems can be useful, they have several important limitations. For example, a scheduling system may remind a user at 9:50 am that a 10:00 am meeting has been scheduled. If the user realizes that he or she will be late for the meeting because of some last minute business, each of the attendees must be manually notified, such as by calling them on the telephone. This can be a time consuming task, especially when a large number of people are scheduled to be at the meeting.

Another problem with known scheduling systems is that a user is not told in advance that he or she will be late for an appointment; Consider the case where a user has a meeting in another town, and that it usually takes one hour to travel to that town. A user who is still at his or her desk at 9:30 am will probably be late for a 10:00 am meeting, but known scheduling systems do not recognize this fact.

Further, although it might typically take one hour to travel to the other town, there might be a severe rainstorm on that day, in which case it would be more realistic to allow two hours for the user to reach the meeting. Similarly, there may be a traffic accident on the main highway between the two towns. This will also delay the user.

The problem of calculating if a user will be late for an appointment can be even more difficult. Suppose, for example, that a user is scheduled to take an 8:00 am flight to attend a 10:00 am appointment at another airport, and the flight is scheduled to arrive at 9:30 am. If the flight is delayed by less than half an hour, the user will not be late for the appointment. If, however, the flight is delayed by more than half an hour, the user will be late. Moreover, when a user drives to an appointment, it can be difficult to determine if the user will be late because the roads in the area may not lead directly to the appointment location.

Still another problem with known scheduling systems is that the information is typically stored locally on the user's computer. If a user is not near his or her computer, there is no simple way to access the information. Even worse, all of the information in the calender can be lost if there is a computer failure.

In view of the foregoing, it can be appreciated that a substantial need exists for an advanced scheduling system that calculates if a user will be late for an appointment and/or automatically notifies the other attendees when the user will be late, and solves the other problems discussed above.

SUMMARY OF THE INVENTION

The disadvantages of the art are alleviated to a great extent by a method for managing a scheduling system in which information about an appointment is received from a user. Information about an attendee associated with the appointment, including attendee notification information, is also received. When it is determined that the user will be late for the appointment, an attendee notification message is automatically generated using the attendee notification information.

In another embodiment of the present invention, information about an appointment, including appointment time information and appointment location information, is received from a user. User location information is also received and it is determined if the user will be late for the appointment based on the user location information, the appointment location information, the appointment time information and the current time of day.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
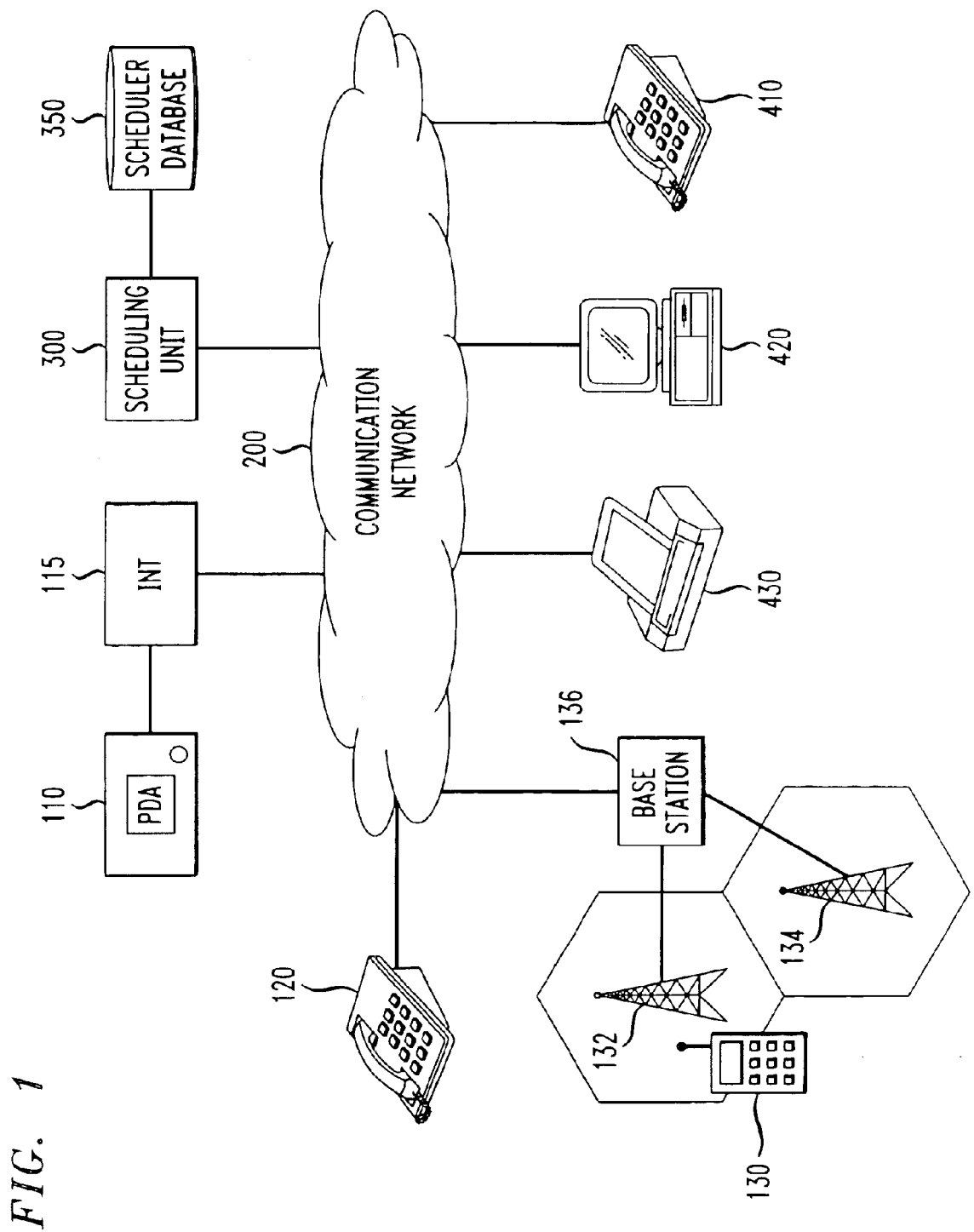
FIG. 1 illustrates an advanced scheduling system according to an embodiment of the present invention.

The present invention is directed to an advanced scheduling and messaging system. Referring now in detail to the drawings wherein like parts are designated by like reference numerals throughout, there is illustrated in FIG. 1 an advanced scheduling system according to an embodiment of the present invention. A user accesses a scheduling unit 300 through one or more access devices 110, 120, 130. According this embodiment, the user communicates with the scheduling unit 300 through a communication network 200. The communication network 200 may be the Public Switched Telephone Network (PSTN), the Internet or any other type of network. It should be noted, however, that the user may instead communicate directly with the scheduling unit 300, such as when the scheduling unit 300 is part of a computer system operated by the user.

One way the user may access the scheduling unit 300 is through an ordinary telephone 120, such as a public telephone that is "hard-wired" to the communication network 200. In this case, the user can communicate by using an Interactive Voice Response (IVR) system and/or touch tone signals.

The user may also access the scheduling unit 300 through a computer 110, such as a Personal Digital Assistant (PDA), connected to an interface unit 1115. The PDA 110 could communicate, for example, over either a hard-wired or a "wireless" connection. Typically, the term PDA refers to a small device that provides mobile computing capabilities, and may even understand a user's handwriting. Both "palm-top" and "laptop" computers are similar to PDAs, except they typically have keyboards, and can be used in place of the PDA 110.

A wireless device 130, such as a Personal Communication Services (PCS) telephone or other wireless telephone, may also be used to communicate with the scheduling unit 300. A PCS system, also known as a digital cellular system, is a wireless phone service that uses a number of antennas 132, 134 to blanket an area of coverage. As the user moves around, the user's phone signal is picked up by the nearest antenna 132 and forwarded to the base station 136. The base station 136 then communicates with the scheduling unit 300 through the communication network 200.

With one or more of these access devices 110, 120, 130, the user may enter information about an appointment, such as the date, time and place of a meeting, and a list of attendees into the scheduling unit 300. For each attendee, the user enters an attendee "profile" that includes, for example, how that attendee should be notified if the user will be late for the appointment. The scheduling unit 300 may store this information in a scheduler database 350.

For example, the following information about an appointment could be stored in the scheduler database 350:

Appointment Date: May 20, 1998
Appointment Time: 10:00 am
Appointment Place: Washington, D.C.
Attendees: Mr. Jones
  (notify by e-mail: jones@att.com)
  Ms. Smith
  (notify by telephone: 555-1234)

If the user previously entered a profile for a particular attendee, the scheduling unit 300 may reuse that profile, if desired. The scheduling unit 300 may also access other databases, such as an employee directory, to help the user create attendee profiles.

As can be seen by the above example, there are any number of ways that an attendee may be notified when the user will be late for an appointment. For example, the scheduling unit 300 may deliver an audio message to the attendee by calling a telephone 410 or by placing the message on the attendee's voice mail system. Similarly, the scheduling unit 300 may send a message to the attendee's paging device (not shown in FIG. 1) or facsimile machine 430. The scheduling unit 300 may also send an electronic mail, or "e-mail," message to the attendee's computer 420. As used herein, the term "e-mail" encompasses all computer readable messages, including ASCII text and non-text files, such as graphic images and sound files. Such messages can be sent by using, for example, the Transport Control Protocol/Internet Protocol (TCP/IP) suite of protocols. A popular protocol for sending e-mail is Simple Mail Transfer Protocol (SMTP) and a popular protocol for receiving e-mail is Post Office Protocol (POP3). The scheduling unit 300 may also place information on an Intranet, the Internet, or a World Wide Web page to be retrieved by the attendee using the computer 420. If desired, the attendee may be notified by several different methods and the scheduling unit 300 may, for example, translate a message from text to speech, from speech to text, or between any other forms of communication.

The message to attendees may be a default message that is always used by the scheduling unit 300. The user may also create a custom default message, or a custom message for a particular appointment. The message could say, for example, "I am running [x] minutes late," where the scheduling unit replaces [x] as appropriate. The scheduling unit may automatically send the message to the attendees without user intervention, or may prepare a "draft" message for the user's approval. In this case, the message may be sent to the attendees only after the user reviews the message, and makes any necessary changes.

In addition to sending the message to an attendee, the scheduling unit 300 may receive a response back from an attendee. For example, a message delivered using the telephone 410 might state "I am running 45 minutes late. Press 1 to reschedule our meeting to 10:45 am. Press 2 to cancel our meeting." The scheduling unit would then record the attendee's response and may send a message, such as a pager or e-mail message, back to the user. Similarly, the scheduling unit 300 may ask the attendee to leave a voice message for later delivery to the user. The appropriate message, requested response, and other user information can be stored as a user profile in the scheduler database 350.

One way the scheduling unit 300 may determine if a user will be late for an appointment is by direct user input. For example, if a user does not confirm that he or she has arrived at a meeting location by the time the meeting was to start, the scheduling unit 300 may automatically generate the message for the attendees. The system may be configured, such as through user profile information, to send a message a fixed period of time before, or after, the appointment. Other methods for determining if the user will be late are described in detail with respect to FIG. 2.

The advanced scheduling system shown in FIG. 1 will now be explained by way of an example. A user enters information about a 10:00 an meeting into his PDA 110. He configures the system such that if he does not confirm his attendance at the meeting by 9:55 am, a telephone call will be placed to Ms. Smith's telephone 410. If there is no answer, an e-mail message will be sent to Ms. Smith's desktop computer 420. In either case, the user selects his default message: "I am running late. Please be patient."

The scheduling unit 300 stores all of this information in the scheduler database 350. If the user arrives at the meeting on time, he can access the scheduling unit 300 through any telephone 130 and confirm that he is not late. In this case, the scheduling unit 300 does not send a message to Ms. Smith. If, however, the user is stuck in traffic, the scheduling unit 300 will automatically notify Ms. Smith as directed.

Figure 2:
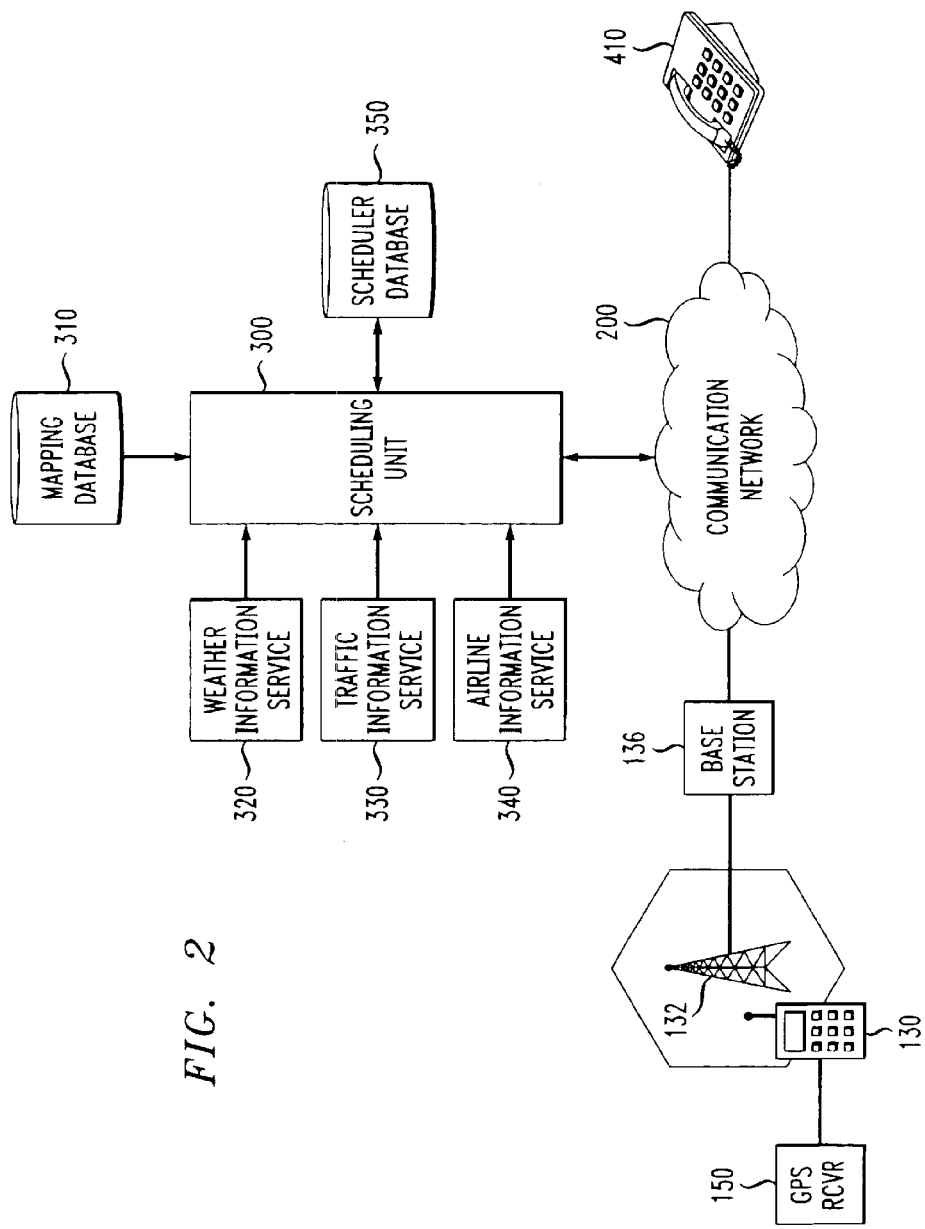
FIG. 2 shows an advanced scheduling system, including a more detailed view of information that can be used by the scheduling unit of FIG. 1, according to an embodiment of the present invention.

FIG. 2 shows an advanced scheduling system, including a more detailed view of information that can be used by the scheduling unit 300. As before, a user accesses the scheduling unit 300 through a communication network 200 using, for example, a wireless device 130. According to an embodiment of the present invention, the scheduling unit 300 determines if a user will be late for an appointment based on the user's present location.

For example, the scheduling unit 300 can continuously calculate an estimated "time of arrival" for the user based on the distance between the user and the appointment and the speed at which the user is traveling. For example, the time of arrival may be t+d/v, where t is the current time, d is the distance in miles and v is the user's actual or assumed velocity in miles per hour. The scheduling unit 300 may use a similar calculation, if desired, to determine if a proposed schedule is physically possible. For example, if the user enters a first meeting at a first time and place, a second meeting scheduled shortly thereafter may be flagged if it is extremely far away.

Suppose the user has scheduled a 10:00 am appointment in Washington, D.C., the user is currently 100 miles away from Washington at 9:00 am, and the scheduling unit 300 has been configured to assume that the user travels at 50 miles per hour (mph). Here, the user's estimate time of arrival will be 9:00 am+(100 miles/50 mph), or 11:00 am. Thus, the scheduling unit 300 can either (1) assume the user will be late and prepare and/or send the notifications as required or (2) tell the user how far away he or she currently is from the appointment and ask the user if the messages should be prepared and/or sent to the attendees. The action that should be taken by the scheduling unit 300 can be stored in the user's profile along with, for example, that speed that should be used in the determination and whether or not any "window of time" should be provided before or after the beginning of the meeting. By way of example, a user can request that 45 mph always be used, and that messages should be automatically generated and sent to attendees if the user will be at least 15 minutes late.

To determine if the user will be late in this way, it is important that the scheduling unit 300 know both the location of the appointment, which can be stored in the scheduler database 350, and the location of the user. There are any number of ways that the location of the user can be determined. The user, for example, could simply enter the information into the scheduling unit 300. For example, the user may inform the scheduling unit that he is in "Field Office 4," using, for example, a PDA or wireless phone 130. The scheduling unit 300 can be configured to translate this into a location, or to already know the distances between various field offices.

Another method to determine user location is with, for example, a caller identification system that provides an Automatic Number Identification (ANI) number, commonly known as the "telephone" number, for the telephone from which the user placed a call. For example, the user may call the scheduling unit 300 from a pay telephone located on the side of a road. Based on the telephone number of the pay telephone and an ANI location database, the scheduling unit 300 may determine the location of the user. Similarly, some wireless phone services can determine an approximate location of a user. This can be based on, for example, which antenna 132 is communicating with the base station 136.

A more exact method of determining the user's location would be to connect a Global Positioning System (GPS) receiver 150 to, for example, the user's access device or vehicle. A GPS receiver can pinpoint a geographic location based on signals received from satellites. The GPS receiver may also be able to calculate the user's speed and direction of travel. This information may then be used by the scheduling unit 300 to determine if the user will be late for the appointment.

Other ways may be used to determine the user's location. For example, whenever a user makes a purchase with a credit card, that "event" may be used to link the user to a particular location, such as a store or a hotel, at a particular time. Similarly, accessing an Automated Teller Machine (ATM) may provide the scheduling unit 300 with information about the location of the user.

Note that the scheduling unit 300 does not have to assume that the user will travel in a straight line, at a fixed velocity, from his current location to the appointment. For example, a mapping database 310 may be used to determine how many "road miles" are between the user and the appointment. For example, a user can be only five miles away from an appointment location, but the mapping database may indicate that the user must travel 10 miles out of his way in order to cross a bridge. The mapping database 310 may also include information about whether various roads are highways, country roads, city roads, etc. All of this information may be used by the scheduling unit 300 to adjust the estimated time of arrival.

The scheduling unit 300 may access other "environment" information agents 320, 330, 340 to better predict if the user will be late for the appointment. For example, a weather information service 320 may provide information about road conditions that will change the nominal miles-per-hour used in the determination. Similarly, a traffic information service 330 may provide additional information about congestion on major roads.

Although the examples described above involve a user driving to an appointment, other situations may be handled by the scheduling unit 300. For example, the user may tell the scheduling unit 300 which airline flight will be taken to a meeting. The scheduling unit can then use information from an airline information service 340, such as flight delays or cancellations, to determine if the user will be late.

Moreover, the scheduling unit 300 may be used even if all of a user's meetings take place in the same building within the same small campus. In this case, a "smart badge" providing user location information may be coupled to the scheduling unit 300. Of course, the user's speed of travel would be adjusted to reflect that he is walking to the various appointments.

Figure 3:
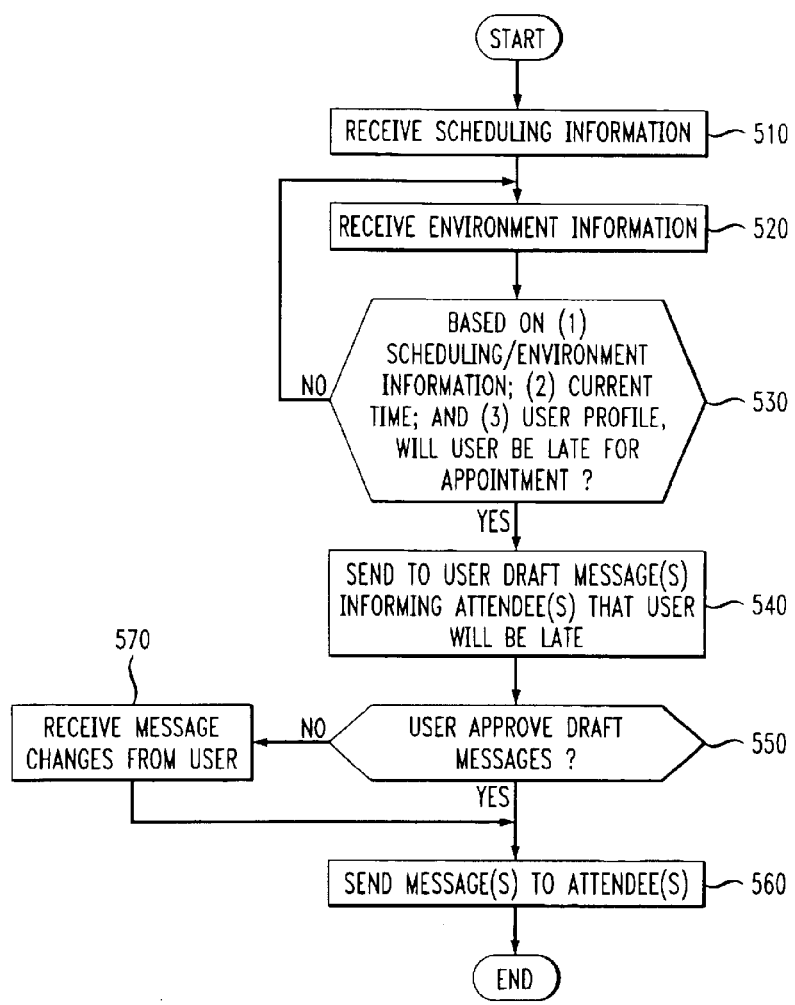
FIG. 3 is a block flow diagram of a method of operating an advanced scheduling system according to an embodiment of the present invention.

FIG. 3 is a block flow diagram of a method of operating an advanced scheduling system according to an embodiment of the present invention. Scheduling information, such as the time and place of a meeting, is received at step 510. If desired, environment information, such as traffic and weather information, is received at step 520. It may then be determined at step 530 if the user is currently going to be late for the meeting based on, for example: the scheduling and environment information; the current time; and user profile information. If the user is not going to be late, nothing further needs to be done, according to this embodiment, beyond the continued monitoring of the situation.

If the user will be late, draft messages notifying attendees of the situation may be prepared and sent to the user at step 540. If the user does not wish to see the draft messages, the messages may be sent directly to the attendees. Once the user approves the messages at step 550, or changes the messages at step 570, the messages may be sent to the attendees at step 560.

As is known in the art, the operations described above can be performed by hardware, software, or some combination of software and hardware. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format. As used herein, the phrase "adapted to be executed by a processor" is meant to encompass instructions stored in a compressed and/or encrypted format, as well as instructions that must be compiled, or installed by an installer, before being executed by the processor.

Although various embodiments are specifically illustrated and described herein, it will be appreciated that modifications and variations of the present invention are covered by the above teachings and within the purview of the appended claims without departing from the spirit and intended scope of the invention. For example, although certain ways of sending messages to attendees were used to illustrate the present invention, it can be appreciated that other ways of sending messages may be used instead. In addition, although the scheduling system has been illustrated as automatically generating a notification message when a user will be late for an appointment, messages may instead be generated as a result of other information. Similarly, although particular methods of determining the user's location have been illustrated, other methods will also fall within the scope of the invention.

What is claimed is:

1. A method for managing a scheduling system, comprising the steps of:
   receiving information about an appointment from a user;
   receiving information about an attendee associated with the appointment, including attendee notification information;
   determining meeting status information;
   automatically generating an attendee notification message using the attendee notification information based on the meeting status information; and
   receiving a response to the attendee notification message from an attendee, the response changing the time of the appointment, wherein the meeting status information indicates if the user will be late for the appointment, said step of automatically generating an attendee notification message is performed when the meeting status indication information indicates that the user will be late for the appointment.

2. The method of claim 1, wherein the attendee notification information is a telephone number and said step of generating is performed by generating an audio message.

3. The method of claim 1, wherein the attendee notification information is an electronic mail address and said step of generating is performed by generating an electronic mail message.

4. The method of claim 1, wherein said step of determining is based on information received from a computer through a communication network.

5. The method of claim 4 wherein said steps of receiving can be performed from multiple access devices.

6. The method of claim 1, wherein said step of determining is based on information received from a telephone through a communication network.

7. The method of claim 1, wherein said step of determining is based on information received from a wireless device through a communications network.

8. The method of claim 1, wherein the information about the appointment includes appointment time information and appointment location information, and wherein said step of determining comprises:
   receiving user location information; and
   deciding if the user will be late for the appointment based on the appointment time information, the appointment location information, the user location information and a time associated with the user location information.

9. The method of claim 8, wherein said step of deciding comprises:
   calculating a travel distance based on the appointment location information and the user location information;
   calculating a time of arrival based on the time associated with the user location information, the travel distance and a travel velocity; and
   comparing the calculated time of arrival with the appointment time information.

10. The method of claim 9, further comprising the steps of:
    receiving map information from a mapping database; and
    adjusting the travel distance based on the appointment location information, the user location information, and the map information.

11. The method claim 9, further comprising the steps of:
    receiving environment information; and
    adjusting the travel velocity based on the environment information.

12. The method of claim 9, wherein said step of comparing is performed by comparing the calculated time of arrival with the appointment time information and a predetermined fixed period of time.

13. The method of claim 1, further comprising the step of:
    sending the attendee notification message to the attendee.

14. The method of claim 13, wherein the response received from the attendee to the attendee notification message changes the information about the appointment.

15. The method of claim 1 wherein the response from the attendee can be received by page, facsimile or e-mail.

16. A scheduling system, comprising:
    a scheduler database for storing information about an appointment and information about an attendee associated with the appointment, including attendee notification information; and
    a scheduling unit coupled to said scheduler database and configured to determine if a user will be late for the appointment, said scheduling unit being further configured to (i) send an attendee notification message to the attendee using the attendee notification information when the user will be late for the appointment, and (ii) receive a response from the attendee to the attendee notification message, the response changing the time of the appointment.

17. An article of manufacture comprising a computer-readable medium having stored thereon instructions adapted to be executed by a processor, the instructions which, when executed, define a series of steps to manage a scheduling system, cause a series of steps to be performed, said steps comprising:
    receiving information about an appointment from a user;
    receiving information about an attendee associated with the appointment, including attendee notification information;
    determining if the user will be late for the appointment;
    sending an attendee notification message to the attendee using the attendee notification information when the user will be late for the appointment, and
    receiving a response from the attendee to the attendee notification message, the response changing the time of the appointment.

18. A method for managing a scheduling system, comprising the steps of:
- receiving information about an appointment, including appointment time information and appointment location information, from a user;
- receiving user location information;
- determining if the user will be late for the appointment based on the user location information, the appointment location information, the appointment time information and a time associated with the user location information; and
- receiving a response from an attendee of the appointment, the response changing the time of the appointment.

19. The method of claim 18, wherein said step of determining comprises the steps of:
- calculating a travel distance between the appointment location and the user location based on the appointment location information and the user location information;
- calculating a time of arrival based on the time associated with the user location information, the travel distance and a travel velocity; and
- comparing the calculated time of arrival with the appointment time information.

20. The method of claim 19, further comprising the steps of:
- receiving map information from a mapping database; and
- adjusting the travel distance based on the appointment location information, the user location information, and the map information.

21. The method claim 19, further comprising the steps of:
- receiving environment information; and
- adjusting the travel velocity based on the environment information.

22. The method of claim 21, wherein the environment information is weather information.

23. The method of claim 21, wherein the environment information is traffic information.

24. The method of claim 21, wherein the environment information is airline information.

25. The method of claim 18, wherein the user location information is generated by a global positioning satellite receiver.

26. The method of claim 18, wherein the user location information is calculated from an automatic number identification number.

27. The method of claim 18, wherein the user location information is received through a communication network.

28. A scheduling system, comprising:
- a scheduler database for storing information about an appointment, including appointment time information and appointment location information;
- location determination unit configured to output user location information; and
- a scheduling unit coupled to said scheduler database and said location determination unit, said scheduling unit being configured to (i) determine if a user will be late for the appointment based on the user location information, the appointment location information, the appointment time information and a time associated with the user location information (ii) receive a response from an attendee of the appointment, the response changing the time of the appointment.

29. An apparatus to manage a scheduling system, comprising:
- means for receiving information about an appointment, including appointment time information and appointment location information, from a user;
- means for receiving user location information;
- means for determining if the user will be late for the appointment based on the user location information, the appointment location information, the appointment time information and a time associated with the user location information; and
- means for receiving a response from an attendee of the meeting, the response changing the time of the appointment.

30. An article of manufacture comprising a computer-readable medium having stored thereon instructions adapted to be executed by a processor, the instructions which, when executed, define a series of steps to manage a scheduling system, said steps comprising:
- receiving information about an appointment, including appointment time information and appointment location information, from a user;
- receiving user location information;
- determining if the user will be late for the appointment based on the user location information, the appointment location information, the appointment time information and a time associated with the user location information; and
- receiving a response from an attendee of the appointment, the response changing the time of the appointment, if it is determined that the user will be late for the appointment.

31. An article of manufacture comprising a computer-readable medium having stored thereon instructions adapted to be executed by a processor, the instructions which, when executed, define a series of steps to manage a scheduling system, said steps comprising:
- receiving information about an appointment, including appointment time information and appointment location information, from a user;
- receiving user location information;
- determining if the user will be late for the appointment based on the user location information, the appointment location information, the appointment time information and a time associated with the user location information;
- notifying an attendee of the appointment, if it is determined that the user will be late for the appointment; and
- receiving a response from the attendee, the response including a proposal for a new time for the appointment.

32. The method of claim 31 wherein the recited steps are performed by a PDA.

* * * * *